A. H. HARRIS.
TIRE RIMMING APPARATUS.
APPLICATION FILED JAN. 18, 1921.

1,429,733. Patented Sept. 19, 1922.

Inventor
Archer H Harris
by his Attorney
John R. Nolan

Patented Sept. 19, 1922.

1,429,733

UNITED STATES PATENT OFFICE.

ARCHER H. HARRIS, OF BARBERTON, OHIO, ASSIGNOR OF ONE-HALF TO EVAN A. ARMSTRONG, OF AKRON, OHIO.

TIRE-RIMMING APPARATUS.

Application filed January 18, 1921. Serial No. 438,082.

*To all whom it may concern:*

Be it known that I, ARCHER H. HARRIS, a citizen of the United States, and resident of Barberton, in the county of Summit and State of Ohio, have invented certain new and useful Improvements in Tire-Rimming Apparatus, of which the following is a specification.

This invention relates to tire rimming apparatus which are employed for forcing together, or "rimming", the bull-rings of "cord" tires preparatory to the vulcanizing process. In practicing the rimming operation there is liability of the bull-rings catching and distorting the fabric of the tire, in which event the pressure upon the rings should be immediately stopped, as otherwise the tire will be destroyed.

The object of my invention is to provide a novel rimming apparatus of simple and efficient construction whereby an unobstructed view of the entire inner side of the bull-rings can be had during the operation of forcing them together; thus facilitating and ensuring the accuracy of the operation.

To this end my invention comprises various novel features of construction and combinations of parts which will be hereinafter described and claimed.

In the drawings—

Figure 1:
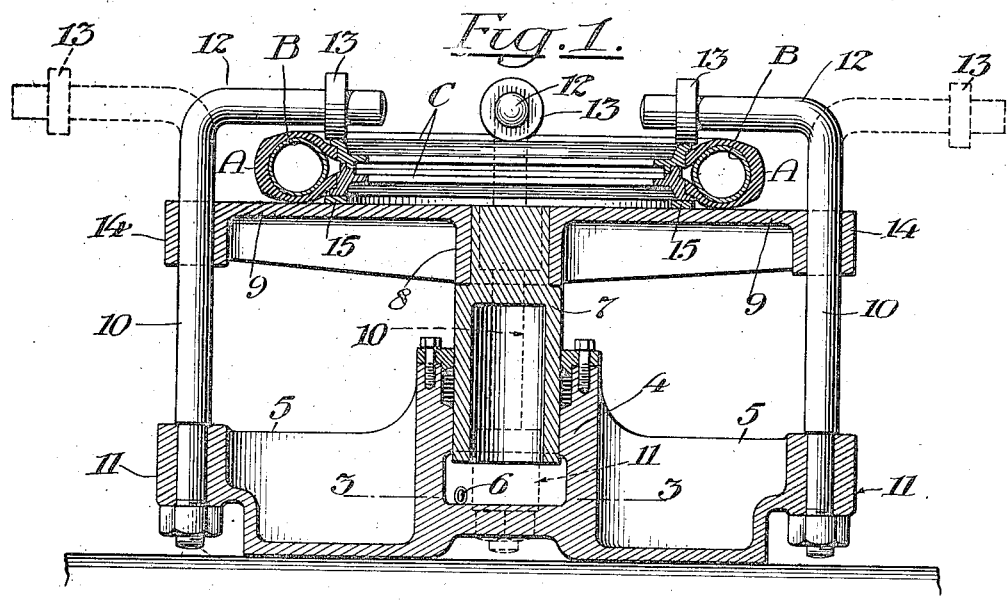
Figure 1 is a transverse vertical section of a rimming apparatus embodying the principle of my invention, showing a tire and its bull-rings as being operated upon by the apparatus.
Figure 2:
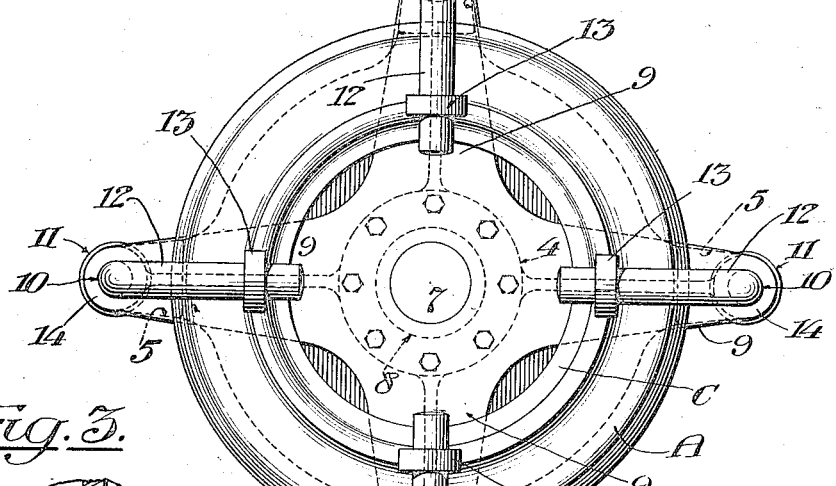
Fig. 2 is a plan view of the same.
Figure 3:
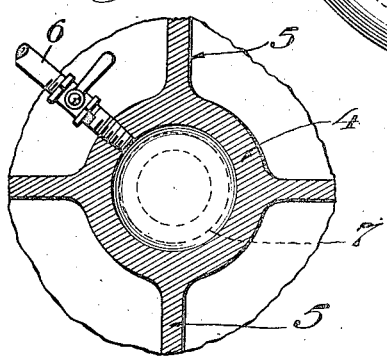
Fig. 3 is a transverse section through the base of the cylinder of the apparatus, as on the line 3—3 of Fig. 1.

Referring to the drawings, A designates a "cord" tire; B the air bag therein, and C the bull-rings encircling the beads or rim of the tire. The bull-rings are herein illustrated as being applied to the tire by means of an apparatus embodying my invention, which apparatus in the preferred form of construction illustrated is as follows:

4 designates a vertically-disposed cylinder which rises from a suitable base comprising a series of radial arms 5, in the present instance four; 6 designates a pipe leading into the interior basal portion of the cylinder from a suitable source of hydraulic or pneumatic energy, and 7 designates a ram or piston fitted within the cylinder and adapted to be forcibly raised by the pressure of the fluid admitted to the cylinder. The upper end of the ram extends above the cylinder and carries a "platen" which comprises in the present instance a hub 8 fast to the ram and a series of radial arms 9 projecting from the hub, which arms correspond in number with and are positioned above the respective arms 5 of the cylinder.

A series of vertical rods 10 are pivotally mounted at their lower ends in bearings 11 on the respective arms 5, the upper ends of which rods have angular portions constituting horizontal abutment members 12 upon which are loosely mounted collars or rolls 13 that may be adjusted longitudinally of said members. These members and their collars, by virtue of the lower pivotal mounting of the rods, are bodily movable over or away from the respective arms 9 of the platen, which arms are provided at their outer ends with perforated bosses 14 that are slidably fitted to and guided on the respective rods.

A ring 15 placed on the platen is adapted to support the bull-rings C of the tire. This ring 15 is a removable member so that supporting rings of different sizes may be readily used according to the size of the tire to be operated upon.

The operation of the apparatus above described is as follows: The ram and the platen being in down position, and the members 12 with their collars or rolls 13 being swung outward (as indicated by dotted lines in Fig. 1) a ring 15 of proper size is placed on the platen; and the inflated raw tire A with the bull-rings C associated therewith, is imposed on the platen, the body of the tire resting on the platen arms 9 and the lower bull-ring resting on the ring 15. This done, the members 12 are swung inward over the tire and the collars or rolls 13 are positioned to overhang the upper bull-ring. Pressure is then applied to the ram, and the platen is forcibly raised, thus, by the counteraction of the collars or rolls, forcing the bull-rings tightly together and applying them intimately to the proximate beads of the tire. When the rimming operation has been completed the ram is lowered by releasing the pressure therefrom, and the members 12 are swung outward, thus permitting the ready removal of the tire and its associated bull-rings from the apparatus.

By the construction and operation above described it will be seen that the operator has an unobstructed view of the inner side of the bull-rings and can thus watch and control the whole operation as the rings are being positioned on the tire.

It is to be understood that I do not limit my invention to the details of construction herein shown and described, as the structure may be modified within the principle of the invention and the scope of the appended claims.

I claim—

1. In a tire-rimming apparatus, the combination with a tire and bull-ring supporting element and means for actuating the same, of a series of spaced-apart abutment members for the bull-ring, said members being supported for horizontal rotation on vertical axes outwardly of the periphery of the tire on said element and being movable over or away from the path of the said element, as desired.

2. In a tire-rimming apparatus, the combination of means for supporting a tire and its bull-rings, a series of members pivotally supported for horizontal rotation on vertical axes in spaced relation to each other and laterally of the platen and being movable into position over or away from said platen, as desired, and means for effecting relative pressure movement between said platen and members.

3. In a tire-rimming apparatus, the combination of a platen, a removable ring thereon, means for actuating said platen and ring, and a series of spaced-apart abutment members mounted for horizontal rotation on vertical axes laterally of the platen and being movable over or away from the path of the platen, as desired.

4. In a tire-rimming apparatus, the combination of a platen, means for actuating the same, a series of spaced-apart members movable over or away from the path of the platen, as desired, and adjustable pressure rollers loosely mounted on said members.

5. In a tire-rimming apparatus, the combination of a platen, a removable ring thereon, means for actuating the said platen and ring, a series of spaced-apart members movable over or away from the path of the platen, as desired, and adjustable pressure devices on said members.

6. In a tire-rimming apparatus, the combination of a cylinder having a suitable base, a ram in said cylinder, a platen affixed to said ram and having spaced laterally-disposed guides, and a series of vertical rods pivotally supported by said base at spaced intervals and extending through the guides of the platen, the upper ends of said rods having angular members which may be swung through a horizontal arc over or away from the path of the platen, as desired.

7. In a tire-rimming apparatus, the combination of a cylinder having a suitable base, a ram in said cylinder, a platen affixed to said ram and having spaced guides, a series of vertical rods pivotally supported by said base at spaced intervals and extending through the guides of the platen, the upper ends of said rods having angular members which may be swung over or away from the path of the platen, as desired, and pressure devices adjustably mounted on said angular members.

8. In a tire-rimming apparatus, the combination of a cylinder having a suitable base, a ram in said cylinder, a platen affixed to said ram and having spaced guides, a removable supporting ring on said platen, a series of vertical rods pivotally supported by said base at spaced intervals and extending through the guides of the platen, the upper ends of said rods having angular members which may be swung over or away from the path of the platen, as desired, and pressure devices adjustably mounted on said angular members.

Signed at Cleveland in the county of Cuyahoga and State of Ohio this 12th day of Jan'y A. D. 1921.

ARCHER H. HARRIS.